United States Patent [19]

Roland et al.

[11] Patent Number: 5,171,790
[45] Date of Patent: Dec. 15, 1992

[54] ELASTOMER BLEND FOR SOUND AND VIBRATION DAMPING

[75] Inventors: Charles M. Roland, Waldorf, Md.; Craig A. Trask, Richmond, Va.

[73] Assignee: The United States of America as represented by the Secretary of the Navy, Washington, D.C.

[21] Appl. No.: 504,477

[22] Filed: Apr. 4, 1990

[51] Int. Cl.$^5$ .................. C08L 9/00; C08L 47/00
[52] U.S. Cl. .................. 525/236; 525/191; 524/526
[58] Field of Search .................. 525/236, 191; 524/526

[56] References Cited

U.S. PATENT DOCUMENTS

| | | | |
|---|---|---|---|
| 4,224,197 | 9/1980 | Ueda et al. | 525/236 |
| 4,268,433 | 5/1981 | Sawatari et al. | 525/263 |
| 4,321,168 | 3/1982 | Ueda et al. | 525/236 |
| 4,394,435 | 7/1983 | Farber et al. | 522/110 |
| 4,394,473 | 7/1983 | Winter et al. | 525/237 |
| 4,418,185 | 11/1983 | Throckmorton et al. | 526/201 |
| 4,483,381 | 11/1984 | Scriver | 525/236 |
| 4,790,365 | 12/1988 | Sandstrom et al. | 525/236 |
| 4,894,420 | 1/1990 | Scriver | 525/236 |

*Primary Examiner*—James J. Seidleck
*Assistant Examiner*—W. R. H. Clark
*Attorney, Agent, or Firm*—Thomas E. McDonnell; Barry A. Edelberg

[57] ABSTRACT

An elastomer blend is provided for dissipation of mechanical and sonic energy over a broad temperature range. This blend of elastomers comprises from about 60-95% by weight of polybutadiene having more than about 90% 1,2-microstructure and a molecular weight of at least 80,000, the balance being predominantly polyisoprene having at least about 70% cis-1,4-microstructure and a molecular weight of at least 120,000. The blend has a single glass transition ranging over at least sixty Centigrade degrees.

6 Claims, 1 Drawing Sheet

ELASTOMER BLEND FOR SOUND AND VIBRATION DAMPING

BACKGROUND OF THE INVENTION

The present invention relates in general to an acoustical and vibration dampening composition, and more particularly to a blend of elastomers which exhibit excessive dissipation of mechanical and sonic energy over a broad frequency and temperature range.

DESCRIPTION OF THE PRIOR ART

Some elastomers are known to have desirable dampening characteristics for mechanical and vibrational energy in the region of their glass transition. Normally, however, the glass transition of elastomers extends over a relatively narrow temperature range. As a consequence, the maximum dissipation of mechanical and vibrational energy occurs only in this narrow temperature range of the glass transition. When two immiscible homopolymers are mixed, they normally exhibit two glass transitions over narrow temperature ranges, i.e., one for each homopolymer in the mixture.

Mixtures of thermodynamically miscible polymers can exhibit a single glass transition. In such cases, it is expected that the glass transition of the miscible mixture of polymers will extend over a relatively narrow temperature range. Non-polar hydrocarbon polymers, such as polyisoprene and polybutadiene, are not expected to exhibit miscibility with one another given their absence of specific interaction, i.e., chemical reactivity with one another. For example, mixtures of 1,4-polybutadiene with natural isoprene in all concentrations have two glass transitions extending over narrow temperature ranges. Although high damping in mixtures of these blends can be obtained, the maximum damping is known to occur only in the two narrow ranges of the glass transitions of the respective polymers. It would, therefore, be expected that all mixtures of polyisoprene and polybutadiene would be immiscible and would, therefore, exhibit two glass transitions over two narrow temperature ranges.

Mixtures of polyisoprene and polybutadiene are known. For example, U.S. Pat. No. 4,810,746 discloses a vibration insulating material comprising a copolymer consisting of 45-99.4% by weight of butadiene, 0.5-30% by weight of an ethylenically unsaturated carboxylic acid, 0-40% by weight of a copolymerizable vinyl monomer, and 50-95% by weight of polyisoprene. U.S. Pat. No. 4,790,365 discloses the use in a pneumatic tire of an inner liner compound of syndiotactic-1,2-polybutadiene with at least 90% of its monomeric units of a syndiotactic configuration and polyisoprene. U.S. Pat. No. 4,396,052 discloses a cap tread tire composition comprising 0.5-1.6% by weight of sulfur, 25-75% by weight of polybutadiene having 65-90% by weight of 1,2-bonding units, and 25-75 parts by weight of polyisoprene.

U.S. Pat. No. 4,567,225 discloses a rubber composition comprising 50-90% by weight of polyisoprene and 10-50% by weight of polybutadiene having 40-90 mol % of a 1,2-bond and having within the molecular chain a benzophenone derivative. U.S. Pat. No. 4,414,363 discloses a rubber composition of at least one rubber having a glass transition temperature of from −45 C. to 0° C. comprising a isoprene butadiene copolymer with a cis-1,4-polyisoprene having at least 90 mol % of cis-1,4-linkage content.

It is desirable to have a damping material of a blend of polymers of polybutadiene and isoprene which are miscible and have a single glass transition over a wide temperature range.

SUMMARY OF THE INVENTION

It is an object of the present invention to obtain an improved damping material.

It is another object of the present invention to obtain a damping material suitable for mechanical and acoustic dampening over a broad range of temperatures and frequencies.

It is a further object of the present invention to obtain a blend of polymers which are miscible and exhibit a single glass transition temperature over a wide temperature range.

These and other objects are achieved by a novel blend of elastomers which are particularly suitable for dissipation of mechanical and sonic energy over a broad temperature and frequency range. This blend of elastomers comprises from about 65-95% by weight of polybutadiene having more than about 90% of a 1,2-microstructure and a molecular weight of at least 80,000, the balance being predominantly polyisoprene having at least about 70% of a cis-1,4-microstructure and a molecular weight of at least 120,000. Cross-linked compositions containing these polymer blends are also suitable for vibration and acoustic dampening.

It was found that when the compositions of the present invention are used in admixture, the blends are miscible and exhibit only a single glass transition intermediate to the respective glass transition temperatures of the component polymers.

This single glass transition in the blend of the present invention is the result of thermodynamic miscibility of the two polymers. Such miscibility is very unusual. Without precedent, however, was the discovery that certain compositions exhibit a very broad glass transition. Accordingly, these compositions of the present invention can provide enhanced damping over a broad range of frequency and temperature.

BRIEF DESCRIPTION OF THE DRAWING

A more complete appreciation of the invention will be readily obtained by reference to the following Description of the Preferred Embodiments and the accompanying drawing, wherein:

The sole drawing graphically illustrates the results of differential scanning calorimetry measurements on three blends of varying relative concentrations of PIP and 1,2-PBD.

DETAILED DESCRIPTION OF THE PREFERRED EMBODIMENT(S)

Figure 1:
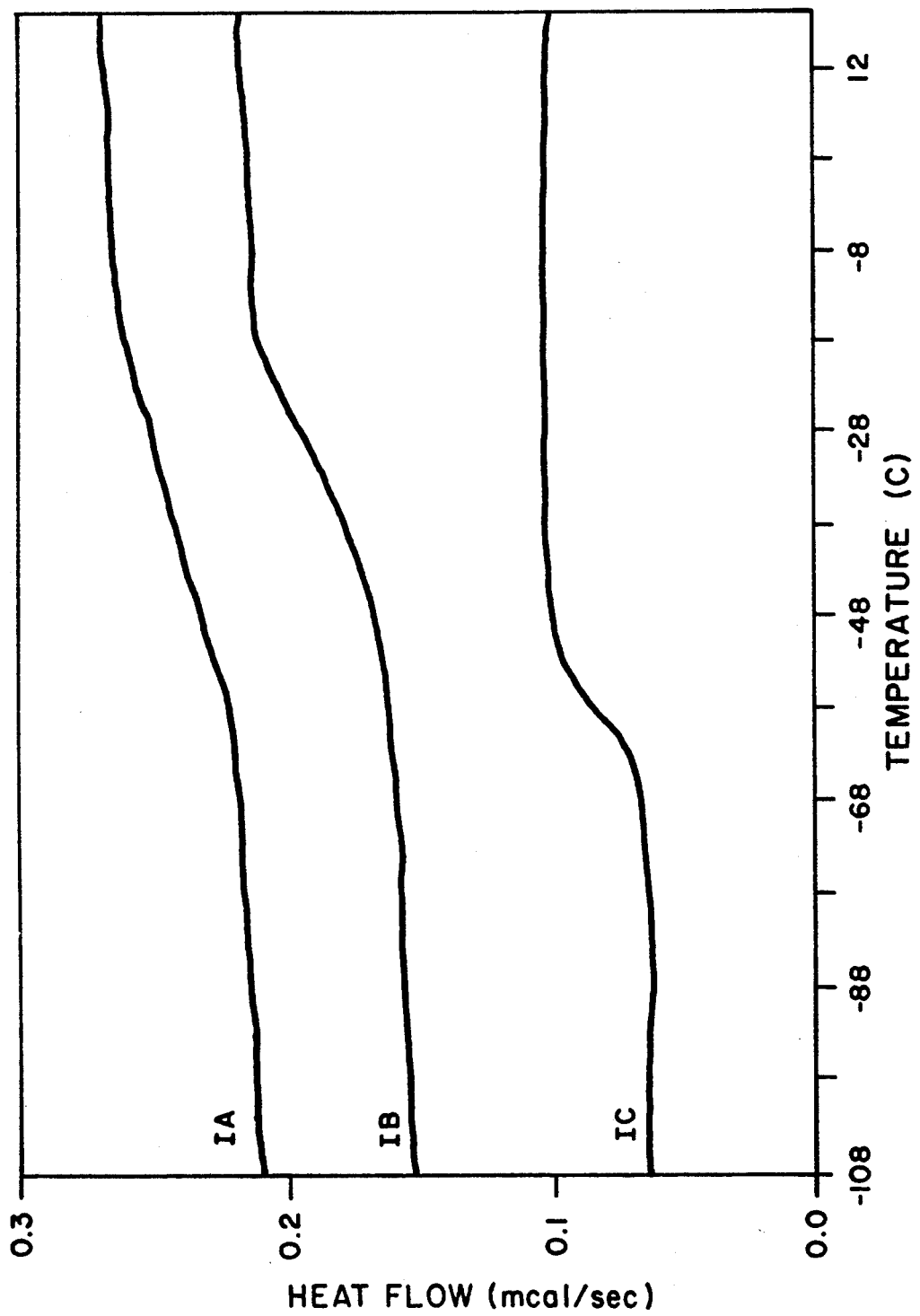

The vibration dampening elastomer blend of the present invention comprises from about 65-95, preferably from about 75-85% by weight of polybutadiene having more than about 90% by weight of the 1,2-microstructure and having a molecular weight of at least 80,000, the balance being 1,4-microstructure of the component polymers. In a preferred embodiment, the polybutadiene contains at least 95% of the 1,2-microstructure. In the preferred composition, the balance of the polybutadiene comprises the 1,4-butadiene microstructure. It is preferred to utilize an atactic polybutadiene, but syndiotactic has also been found to be suitable. In a preferred embodiment, the blend contains from about 75-85% by weight of atactic polybutadiene.

The elastomer of the present invention also contains molecularly dispersed with the polybutadiene a polyisoprene, either the natural or synthetic variety. In a preferred embodiment, the blend contains from about 15-25% by weight of polyisoprene. The polyisoprene preferably contains at least about 70% of the cis-1,4-microstructure. In a preferred embodiment, the polyisoprene contains more than about 90% of the cis-1,4-configuration. It is preferred to use polyisoprene having a molecular weight of at least 120,000 gms/mol. The polyisoprene may be Hevea brasilienis. The elastomer blend of the present invention can also contain non-polymeric ingredients, including carbon black and other fillers, process oils, resins, and stabilizers without loss of the unique dampening qualities offered by the polymer blend of the present invention.

The elastomer blend of the present invention can be prepared by mixing the polymers mechanically using an internal mixer or an open roll mill. Blending can also be accomplished by dissolving the polymers in a solvent such as cyclohexane and then vaporizing the solvent. An advantage of the present blend is that the thermodynamic miscibility makes the blend morphology independent of the method of blending.

The resultant polymer blend can readily be formed into various shapes by standard rubber processing techniques, e.g., cavity molding, calendaring, injection molding, extrusion, etc.

In a preferred embodiment, the blend of polybutadiene and polyisoprene are cross-linked to improve the mechanical properties of the elastomeric blend. It is preferred to use as the cross-linking agent an organic peroxide, for example, dicumyl peroxide. Cross-linking can also be effected by radiation, such as electron beam or gamma ray radiation or by sulfur vulcanization according to well-established procedures. Preferably, the cross-linking is effective until up to about 3% of the monomer units of the polymers are cross-linked.

Elastomeric blends, both molecularly dispersed and cross-linked, have been found to exhibit glass transition ranges measured by a Dynastat rheometer operating at 1.0 Hertz of from about $-20°$ to $-80°$ C. The elastomer blend of the present invention has a glass transition range of about sixty Centigrade degrees. As is known in the art, the temperature of the glass transition will depend on the vibrational frequency. Higher frequencies will be attenuated at higher temperatures and vice versa. The elastomeric blends of the present invention also have been found to have a loss modulus over the glass transition range exceeding about 100 MPa. Unlike virtually all other blends of rubber, the morphology of the composition of the present invention has been found to be thermodynamically stable, and no change in morphology transpires prior to cross-linking, even when the composition is exposed to various temperatures for extended durations. Since the elastomer blend of the present invention is initially polymeric, it offers advantages in handling and processing over thermosetting compounds based on reaction of reactive oligomers or pre-polymers.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth in degrees Celsius; and, unless otherwise indicated, all parts and percentages are by weight.

The entire disclosures of all applications, patents and publications, cited above and below, are hereby incorporated by reference.

EXAMPLE 1

Procedure: Rubbers were mixed at room temperature on an unheated two-roll mill for 3 minutes. Sheets (1 mm thick) were then made by molding the mixture in a cavity mold for 15 minutes at 110° C., followed by slow cooling to room temperature. Rectangular test specimens were cut from the sheet and tested in a Dynastat Rheometer (Imass, Inc.) in uniaxial extension. The compositions and damping characteristics is shown below in Table 1.

TABLE 1

| % Polyisoprene | % Polybutadiene[1] | Frequency Range of Broad Damping [2] |
| --- | --- | --- |
| 100 | 0 | 4 decades |
| 0 | 100 | 5 decades |
| 25 | 75 | >10 decades |
| 25 | 25 | 4 decades |

Only the sample with a composition conforming to the present invention exhibited the high damping associated with the glass transition over a broad band of frequencies (i.e., the range of high damping was more than 10 decades of frequency, rather than only 4 or 5 decades).

EXAMPLE 2

Essentially the same procedure as in Example 1 was followed in preparing and testing three additional samples. The compositions and their damping characteristics are shown in Table 2.

TABLE 2

| % Polyisoprene | % Polybutadiene | Temperature range of Broad Dampening[3] |
| --- | --- | --- |
| 50 | 50 | 25 degrees |
| 25 | 75[4] | 60 degrees |
| 25 | 75[5] | 30 degrees |

As exemplified by the second entry in Table 2, only the compositions of the present invention, which must employ a high concentration of polybutadiene with more than 90% 1,2-units, exhibit high damping over a wide temperature range (60 Centigrade degrees rather than only 25 or 30 Centigrade degrees).

EXAMPLE 3

Blends of high molecular weight polybutadiene (PBD) (of 85% 1,2-microstructure) and polyisoprene (PID) have been found to exhibit single glass transitions suggestive of a segmentally dispersed phase morphology. These transitions are relatively sharp, although miscible polymer mixtures in general exhibit glass transitions somewhat broader than those of the pure components. In blends of 1,4-PBD with PIP, although miscibility is limited to components of low molecular weights (such that the materials are in fact oily rather than rubbers), narrow glass transitions are observed. Calorimetry results were obtained when PIP is blended with PDB of very high (>92%) 1,2-microstructure. Shown in FIG. 1 are differential scanning calorimetry results for three blends of varying relative concentrations of PIP and 1,2-PBD. In these tests, calorimetry measurements (FIG. 1) and linear thermal expansivities (data not shown) were obtained using a Perkin-Elmer DSC-2 and Perkin-Elmer TMA 7, respectively.

Although only a single transition is observed for all the mixtures, in two cases in FIG. 1 the transition occurs over a broad temperature range. While the temperature difference between the onset and midpoint of the heat capacity change at $T_g$ was 2°-3° for the pure components and typically 5°-7° for blends, in mixtures of PIP with a high concentration of 1,2-PBD, this difference was more than 20°. The breadths of these transitions were reproducibly observed irrespective of the rate at which the temperature was changed and remained essentially the same when $T_g$ is approached from either direction. The invariance of these anomalous breadths to the thermal treatment imposed demonstrates that this peculiar transition behavior is not an artifact of nonequilibrium. The least stable composition in FIG. 1 (as judged by the magnitude of the critical value of the Flory interaction parameter) is the one designated IA. When the molecular weight of both the PBD and the PIP are significantly reduced (Sample IB), resulting in a more thermodynamically stable blend composition, the transition remains broad. Conversely, a less miscible sample (IC) has a relatively sharp glass transition, as a result of its lower concentration of the 1,2-PBD. Results equivalent to these differential scanning calorimetry data were obtained when the glass transition behavior was characterized by thermal expansivity measurements.

The preceding examples can be repeated with similar success by substituting the generically or specifically described reactants and/or operating conditions of this invention for those used in the preceding examples.

Further details concerning the present invention can be found in Roland et al, "Damping In Polydienes", Polymeric Materials: Science and Engineering— Proceedings of the ACS Division of Polymeric Material: Science and Engineering, Spring Meeting 1989, Dallas, Tex., Volume 60, pages 832-836 (1989), incorporated herein by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A thermodynamically stable elastomer blend, exhibiting a single glass transition, for dampening vibrational and sonic energy comprising a molecularly dispersed blend of two elastomers, said elastomers comprising: from about 75-85% by weight of polybutadiene containing more than about 95%, 1,2-microstructure with 75-85% by weight of the polybutadiene being atactic polybutadiene having a molecular weight of at least 80,000, and from about 15-25% by weight of polyisoprene containing at least 90% Cis-1,4-microstructure and having a molecular weight of at least 120,000.

2. The elastomer blend of claim 1, wherein the polyisoprene is Hevea brasilienis.

3. The elastomer of claim 1, further comprising filler, process oils, or stabilizers.

4. A thermodynamically stable elastomer blend composition according to claim 1, having a glass transition temperature range in excess of 30 centigrade degrees, and range of dampening in excess of 5 decades.

5. The composition of claim 4 wherein said composition has a glass transition temperature range of about 60 Centigrade degrees, up to about 3% of the monomer units of said polymers are cross-linked, said composition has a minimum loss modulus over said glass transition range of 100 MPa and said composition has a range of dampening in excess of 10 decades.

6. The elastomer blend of claim 3, wherein the filler is carbon black.

* * * * *